(12) United States Patent
Otomaru et al.

(10) Patent No.: US 8,767,230 B2
(45) Date of Patent: Jul. 1, 2014

(54) VARIABLE PRINTING SYSTEM, IMAGE FORMING APPARATUS, AND NON-TRANSITORY COMPUTER READABLE MEDIUM

(71) Applicants: Tomoko Otomaru, Machida (JP); Kazuto Yamamoto, Koganei (JP)

(72) Inventors: Tomoko Otomaru, Machida (JP); Kazuto Yamamoto, Koganei (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/705,735

(22) Filed: Dec. 5, 2012

(65) Prior Publication Data

US 2013/0148135 A1 Jun. 13, 2013

(30) Foreign Application Priority Data

Dec. 8, 2011 (JP) .................................. 2011-268689

(51) Int. Cl.
*G06F 15/00* (2006.01)
*G06F 3/12* (2006.01)
*G06K 1/00* (2006.01)

(52) U.S. Cl.
USPC .......................................... 358/1.13; 358/1.1

(58) Field of Classification Search
None
See application file for complete search history.

(56) References Cited

U.S. PATENT DOCUMENTS

| 7,894,084 B2 * | 2/2011 | Chatcavage et al. ......... 358/1.13 |
| 8,312,113 B2 * | 11/2012 | Kennedy ....................... 709/220 |
| 2010/0238496 A1 | 9/2010 | Oshima | |

FOREIGN PATENT DOCUMENTS

| JP | 2007-293509 A | 11/2007 |
| JP | 2010-218306 A | 9/2010 |

* cited by examiner

*Primary Examiner* — Douglas Tran
(74) *Attorney, Agent, or Firm* — Buchanan Ingersoll & Rooney PC

(57) ABSTRACT

A variable printing system includes: an image forming apparatus including an engine for variable printing; a device communicatively connected to the image forming apparatus; a first control section included in one of the image forming apparatus and the device; and a second control section included in one of the image forming apparatus and the device. The first control section acquires setting information of the engine corresponding to a job instructing variable printing, and performs one of adding the setting information into the job, and storing the setting information in a form of a database. The second control section analyses an output result of a job which has been executed and setting information of the engine corresponding to the job, and instructs the engine, based on a result of the analysis, to change a setting of the engine corresponding to a job to be executed or being executed.

15 Claims, 14 Drawing Sheets

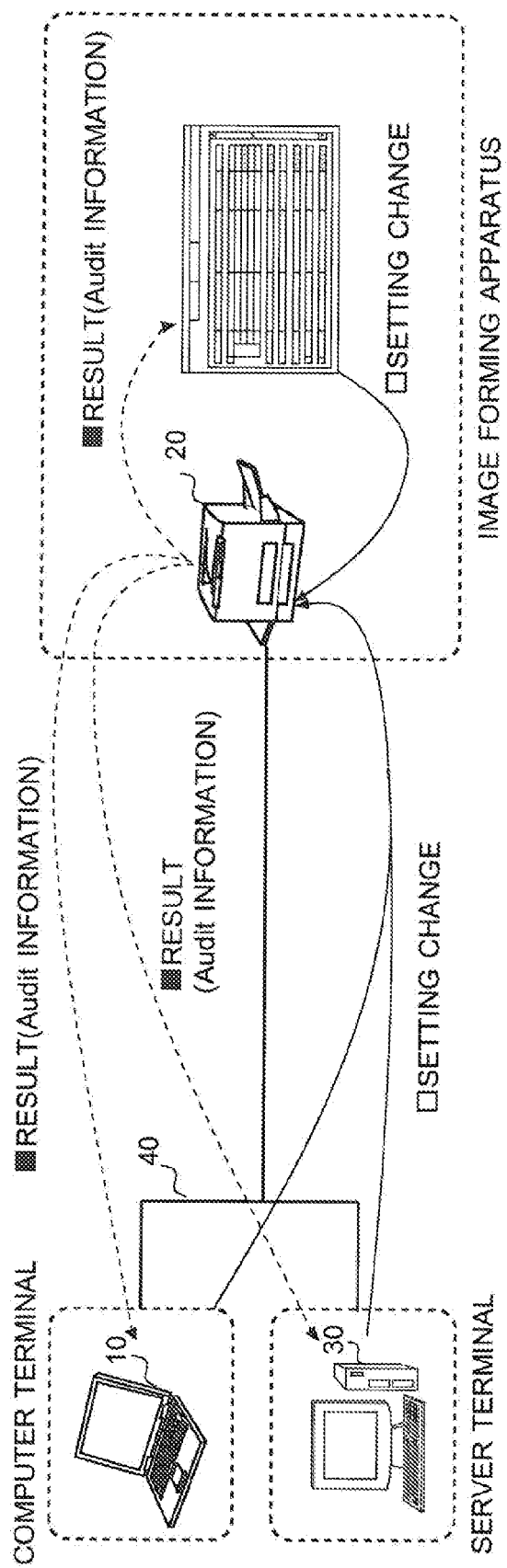

FIG. 8A

PRINT WORK STATION

| JOB LIST | DEVICE | Audit |

| JOB ID | | JOB NAME | PRINT SETTINGS | DEVICE SETTINGS | STATUS |
|---|---|---|---|---|---|
| + 101001 ⊽ | | PDFVT PRINT JOB1 | PB/2250page/··/··· | No Settings | Ready |
| | 001 | Yamada/Tokyo/······ | Punch/500page/A4/··· | No Settings | Complete |
| | 002 | Yamada/Tokyo/······ | PB/500page/A4/··· | No Settings | Jam |
| | 003 | Yamada/Saitama/······ | PB/1000page/B6/··· | No Settings | Waiting |
| | 004 | Yamada/Tokyo/······ | PB/250page/A3/··· | No Settings | Waiting |
| 101002 | | NORMAL PRINT JOB1 | Punch/100page/A4/··· | No Settings | No Staple |
| 101003 | | NORMAL PRINT JOB2 | PB/300page/A3/··· | No Settings | Waiting |
| 101004 | | NORMAL PRINT JOB3 | Staple/20page/A3/··· | No Settings | No Staple |
| + 101005 ⊽ | | PDFVT PRINT JOB2 | ······/1000page/··· | No Settings | Waiting |
| + 101006 ⊽ | | PDFVT PRINT JOB3 | Staple/2000page/··· | No Settings | No Staple |

FIG. 8B

PRINT WORK STATION

| JOB LIST | DEVICE | Audit |

| JOB ID | | JOB NAME | PRINT SETTINGS | DEVICE SETTINGS | STATUS |
|---|---|---|---|---|---|
| 101001 | ⊽ | PDFVT PRINT JOB1 | PB/2250page/···/··· | No Settings | Ready |
| | 001 | Yamada/Tokyo/······ | Punch/500page/A4/··· | No Settings | Complete |
| | 002 | Yamada/Tokyo/······ | PB/500page/A4/··· | A200053 | Printing |
| | 003 | Yamada/Saitama/······ | PB/1000page/B6/··· | No Settings | Ready |
| | 004 | Yamada/Tokyo/······ | PB/250page/A3/··· | A200053 | Ready |
| 101002 | | NORMAL PRINT JOB1 | Punch/100page/A4/··· | No Settings | No Staple |
| 101003 | | NORMAL PRINT JOB2 | PB/300page/A3/··· | No Settings | Waiting |
| 101004 | | NORMAL PRINT JOB3 | Staple/20page/A3/··· | No Settings | No Staple |
| 101005 | ⊽ | PDFVT PRINT JOB2 | ······/1000page/··· | Settings Indicated | Waiting |
| 101006 | ⊽ | PDFVT PRINT JOB3 | Staple/2000page/··· | No Settings | No Staple |

FIG. 9A

| | | | | | | | | | |
|---|---|---|---|---|---|---|---|---|---|
| PRINT WORK STATION | | | | | | | | | |
| JOB LIST | DEVICE | Audit | | | | | | | |
| InputTray1 | InputTray2 | InputTray3 | InputTray4 | InputTray5 | Settings | | | | |
| Audit ID | Job ID | Result | OutputTray/ Issue-Area | Page Cnt | Paper | Size | Curl | Air | Speed |
| + A200001~ | 100001~ | Complete | Sub | 3572 | Plain | A4 | +1 | Auto | Middle |
| + A200021~ | 100015~ | Complete | Sub | 2553 | Coated | A4 | 0 | Strong | |
| − A200053~ | 100043~ | Complete | MainPB | 1827 | Plain | A4 | −1 | Auto | High |
| | 100043 | Complete | MainPB | 27 | Plain | A4 | −1 | Auto | High |
| | 100101 | Complete | MainPB | 300 | Plain | A4 | −1 | Auto | High |
| | 100861 | Complete | MainPB | 1000 | Plain | A4 | −1 | Auto | High |
| | 100931 | Complete | MainPB | 500 | Plain | A4 | −1 | Auto | High |
| A200977 | 100958 | Complete | StrackerMain | 1537 | Color | A4 | +1 | Auto | Middle |

APPLY SETTINGS TO ...

● SIMILAR JOB    SIMILAR-JOB JUDGING FILTER SETTINGS

APPLY

PRINT    OK    CANCEL

FIG. 9B

| PRINT WORK STATION | | | | | | | | | | |
|---|---|---|---|---|---|---|---|---|---|---|
| JOB LIST | DEVICE | Audit | | | | | | | | |

Complete | Cancel | Jam | Settings

| Audit ID | Job ID | Input Tray | Output Tray/ Issue-Area | Number of Occur | Paper | Size | Curl | Air | Speed |
|---|---|---|---|---|---|---|---|---|---|
| [+] A200001~100001~ | | 3 | TransferBelt | 22 | Plain | A4 | +1 | Auto | High |
| [+] A200055~100045~ | | 1 | InputTray1 | 11 | Coated | A3 | 0 | Soft | Middle |
| [-] A200543~100568~ | | 3 | Drum | 7 | Plain | A4 | 0 | Auto | High |
| A200996 | 100976 | 1 | Drum | 1 | Plain | A3 | -3 | Auto | High |
| A200997 | 100976 | 1 | Drum | 1 | Plain | A3 | -2 | Soft | High |

APPLY SETTINGS TO ...

(●) InputTray ▼  5 ▼

APPLY

PRINT   OK   CANCEL

| Audit ID | Job ID | Result | OutputTray/Issue-Area | Input Tray | Page Cnt | Paper | Size | Curl | Air | Speed |
|---|---|---|---|---|---|---|---|---|---|---|
| A200022 | 101001-002 | Jam | TransferBelt | 3 | 328 | Plain | A4 | +1 | Auto | High |

InputTray1 | InputTray2 | InputTray3 | InputTray4 | InputTray5 | Settings

| Audit ID | Result | OutputTray/Issue-Area | Page Cnt | Paper | Size | Curl | Air | Speed |
|---|---|---|---|---|---|---|---|---|
| A200053 ~ | Complete | MainPB | 1827 | Plain | A4 | -1 | Auto | High |
| A200053 | Complete | MainPB | 27 | Plain | A4 | -1 | Auto | High |
| A200112 | Complete | MainPB | 300 | Plain | A4 | -1 | Auto | High |
| A200883 | Complete | MainPB | 1000 | Plain | A4 | -1 | Auto | High |
| A200953 | Complete | MainPB | 500 | Plain | A4 | -1 | Auto | High |
| A200021 ~ | Complete | Sub | 2553 | Coated | A4 | 0 | Strong | Middle |
| A200977 | Complete | StrackerMain | 1537 | Color | A4 | +1 | Auto | Middle |

APPLY SETTINGS TO ...

○ InputTray [ 3 ▼]

● SIMILAR JOB   SIMILAR-JOB JUDGING FILTER SETTINGS

○ SPECIFIED JOB   JOB SPECIFICATION

APPLY

OK

101001 ▼ 002 PDFVT PRINT JOB1  Paper Jam occurs during printing,check the transfer belt

VARIABLE PRINTING SYSTEM, IMAGE FORMING APPARATUS, AND NON-TRANSITORY COMPUTER READABLE MEDIUM

This application is based on Japanese Patent Application No. 2011-268689 filed on Dec. 8, 2011, in Japanese Patent Office, the entire content of which is hereby incorporated by reference.

TECHNICAL FIELD

The present invention relates to a variable printing system, an image forming apparatus, and a non-transitory computer readable medium having storing a variable-printing control program.

BACKGROUND

In recent years, only the amount of printed matter of variable printing is tending upward, while a trend toward paperless environment is accelerating and the amount of printed matter is decreasing all over the world. As a concrete example of the variable printing, there are cited direct mails, and catalogs and brochures which are customized to each customer. In the variable printing, items which are repeatedly used are rasterized and then cached to an internal storage area. Items which are not repeatedly used are rasterized, and are combined with the cached items to form page images. Thereby, rasterization of items which are repeatedly used and duplicated data transmission are reduced, which increase efficiency of the processing.

A job of the variable printing was conventionally described in PPML (Personalized Print Markup Language). An image forming apparatus processed a job of variable printing with interpreting its special file format described in PPML. This conventional method required a dedicated application and employed a format which is unfamiliar to general users, which created a barrier to spread of variable printing. Based on the background, the PDF (Portable Document Format)/VT (Variable Transactional) standard (ISO16612-2:2010) for variable printing has been published in July 2010. In the PDF/VT standard, Adobe Acrobat applications as de facto standard can be used and PDF files which are familiar to uses can be used.

As a technology relating to the variable printing, for example, JP-A No. 2010-218306 discloses the following job management apparatus. The job management apparatus manages, by record, a job based on content data which includes designations associated with a content used in variable data print processing, and on a job ticket corresponding to the content data. The job management apparatus has a structure including: a metadata extracting unit which extracts metadata from the content data; a metadata classification unit which classifies the extracted metadata into control metadata used to control processes of the job and display metadata used to make a display associated with the job; and a generation unit which generates information used to display the job by record, by using values of metadata which are classified as the display metadata with the metadata extraction unit.

In general printing, an image forming apparatus uses regular paper and transfers sheets of the paper in one direction in most cases. Therefore, a jam rarely occurs during a printing process. In contrast, in the variable printing, an image forming apparatus forms images on various kinds of paper and transfers sheets of the paper in various directions in most cases. Therefore, the variable printing has characteristics that images with sufficient quality are hardly obtained and that a jam, such as a paper jam caused during paper transfer, is easily caused.

On the other hand, a job of variable printing according to PPML, contains a job ticket. Settings of the job ticket hold various kinds of information relating to variable printing. As for a job of variable printing according to the PDF/VT standard, one PDF file holds various kinds of information such as category classification and job settings in a manner of a hierarchic structure to form a database. JP-A No. 2010-218306 discloses a structure wherein an output status such as "Printing" and "Completed" appears in a database as information which is not included in job ticket settings. JP-A No. 2007-293509 also discloses a structure wherein an output status such as "Printing" and "Completed" appears in a database as information which is not included in job ticket settings.

However, there are many settings which are not included in the job ticket settings but relate to an engine, in an image forming apparatus. There has not been provided a device that manages and analyzes such the settings to control its output, which may cause a problem that effective reduction of jam occurrence and proper execution of variable printing can be harmed. The present invention seeks to solve these problems.

SUMMARY

There are disclosed illustrative systems, image forming apparatuses, and non-transitory computer readable media as embodiments of the present invention, each for carrying out effective variable printing.

A variable printing system reflecting one aspect of the present invention comprises an image forming apparatus including an engine configured to execute variable printing based on a job including a variable data item and a fixed data item; a device communicatively connected to the image forming apparatus via a communication network; a first control section included in one of the image forming apparatus and the device communicatively connected to the image forming apparatus; and a second control section included in one of the image forming apparatus and the device communicatively connected to the image forming apparatus. The first control section acquires setting information of the engine corresponding to a job instructing the engine to execute variable printing. The first control section further carries out one of adding the setting information into the job instructing the engine to execute variable printing, and storing the setting information in a form of a database with associating the setting information with the job instructing the engine to execute variable printing. The second control section makes an analysis of an output result of a job which has been executed and of setting information of the engine corresponding to the job which has been executed, and instructs the engine, based on a result of the analysis, to change a setting of the engine corresponding to a job to be executed or being executed.

An image forming apparatus reflecting one aspect of the present invention comprises an engine configured to execute variable printing based on a job including a variable data item and a fixed data item; and a control section. The control section acquires setting information of the engine corresponding to a job instructing the engine to execute variable printing. The control section further carries out one of adding the setting information into the job instructing the engine to execute variable printing, and storing the setting information in a form of a database with associating the setting information with the job instructing the engine to execute variable printing. The control section further makes an analysis of an output result of a job which has been executed and of setting information of the engine corresponding to the job which has been executed, and instructs the engine, based on a result of the analysis, to change a setting of the engine corresponding to a job to be executed or being executed.

A non-transitory computer readable storage medium reflecting one aspect of the present invention is a non-transitory computer readable storage medium storing a program to control variable printing in a system, wherein the system including an image forming apparatus including an engine configured to execute variable printing based on a job including a variable data item and a fixed data item. The program comprises first instructions, when executed, causing one of the image forming apparatus and a device communicatively connected to the image forming apparatus to: acquire setting information of the engine corresponding to a job instructing the engine to execute variable printing, and carry out one of adding the setting information into the job instructing the engine to execute variable printing, and storing the setting information in a form of a database with associating the setting information with the job instructing the engine to execute variable printing. The program further comprises second instructions, when executed, causing one of the image forming apparatus and a device communicatively connected to the image forming apparatus to: make an analysis of an output result of a job which has been executed and of setting information of the engine corresponding to the job which has been executed, and instruct the engine, based on a result of the analysis, to change a setting of the engine corresponding to a job to be executed or being executed.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 6 is a block diagram schematically illustrating an outline process of a variable printing system relating to an example of the present invention;

FIG. 8A shows an illustrative screen for displaying a job list (without setting changes) relating to an example of the present invention;

FIG. 8B shows an illustrative screen for displaying a job list (with setting changes) relating to an example of the present invention;

FIG. 9A shows an illustrative screen for displaying Audit information (classified according to input trays) relating to an example of the present invention;

FIG. 9B shows an illustrative screen for displaying Audit information (classified according to status) relating to an example of the present invention;

FIG. 9C shows an illustrative screen for setting an Audit information screen relating to an example of the present invention;

FIG. 10 shows an illustrative screen for displaying Audit information (under printing) relating to an example of the present invention.

DETAILED DESCRIPTION

Figure 1:
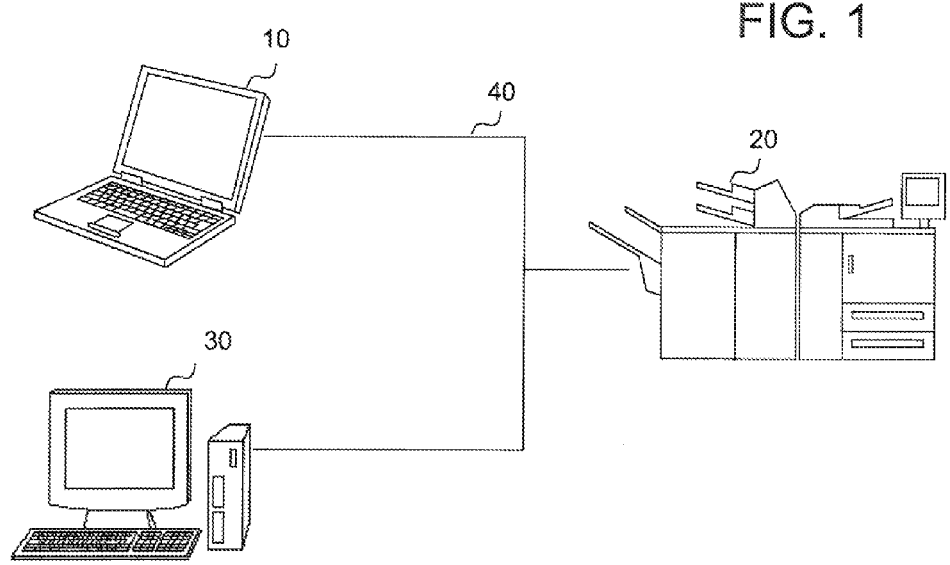
FIG. 1 is a schematic view illustrating a structure of a variable printing system relating to an example of the present invention.

Illustrative embodiments of variable printing systems, image forming apparatus, and non-transitory computer readable media storing a program to control variable printing will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

A variable printing system, image forming apparatus and a non-transitory computer readable medium storing a program to control variable printing provided as embodiments of the present invention, can carry out variable printing effectively, because of the following reason.

One of an image forming apparatus and a device communicatively connected to the image forming apparatus via a communication network in a variable printing system, can carry out one of adding the setting information of the engine into a job as Audit information, and storing the setting information as Audit information in a form of a database with associating the setting information with a job. Further, one of the image forming apparatus and the device communicatively connected to the image forming apparatus via a communication network, can instruct the engine to change a setting of the engine corresponding to a job to be executed or being executed, for example, to be same as a setting of the engine corresponding to a job which has been executed with a normal output result.

Organizing settings of the engine in a form of a database allows a highly accurate analysis of output results. Further, output instructions of a job based on a result of the highly accurate analysis enables an effective output process.

As described in the above description about the background, variable printing has a characteristic that various types of paper are used and sheets of the paper are transferred in various directions, which are different from normal printing. Therefore, the variable printing easily causes a jam in an engine for performing a printing process, which is a problem. Therefore, in variable printing, storing information that which type of printing process causes a jam can prevent a jam from occurrence by means of a setting change of the engine instructed when the same type of printing process is carried out. Especially, because parts which are repeatedly used are printed frequently under the same condition, managing and analyzing such the information prevent occurrence of jams effectively.

In an embodiment of the present invention, a job of variable printing according to PPML includes a job ticket, and a setting of the job ticket holds various types of information relating variable printing. In another embodiment of the present invention, as for a job of variable printing according to PDF/VT, one PDF file holds various types of information such as categorization and a job setting in a manner of hierarchy to form a database. Therefore, various types of setting information relating to an engine, such as a setting of an adjustment of paper curl, a condition of air-blowing during a paper feed process, a paper feed speed, a fixing temperature, and printing positions on both sides of a sheet of paper (hereinafter, such the information to be managed is called as Audit information), is stored in a form of a database. Then, jobs are analyzed in higher accuracy by utilizing the Audit information, such that which combination of items of setting information brings a good (or bad) result, and a job output is instructed with taking Audit information into account, based on the result of the highly accurate analysis, which enables an output process to be more efficient.

EXAMPLES

Figure 2:
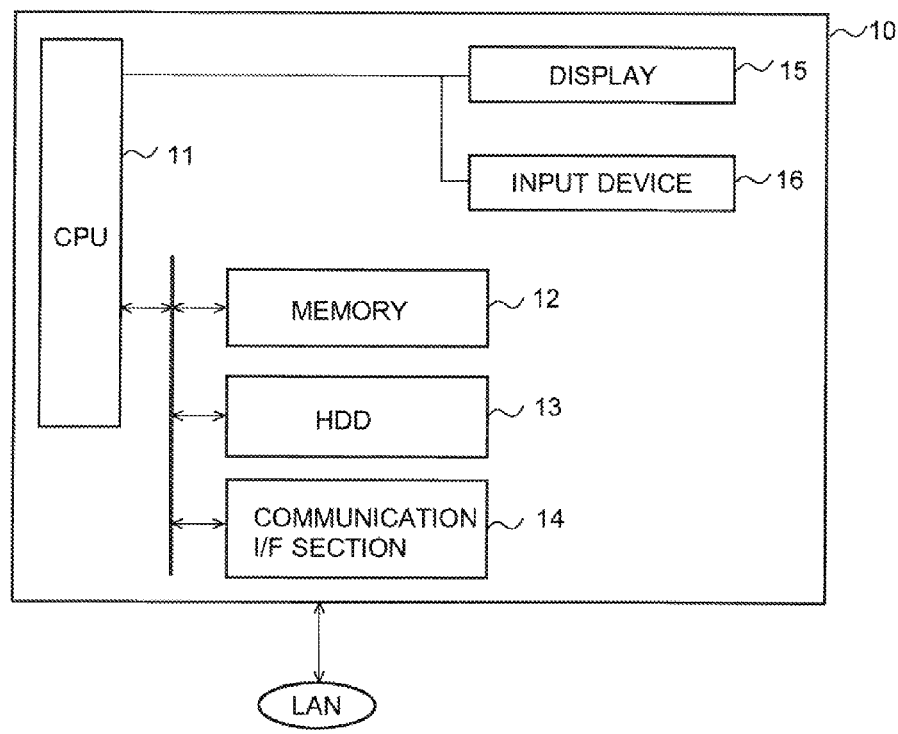
FIG. 2 is a block diagram illustrating a structure of a computer terminal relating to an example of the present invention.
Figure 3:
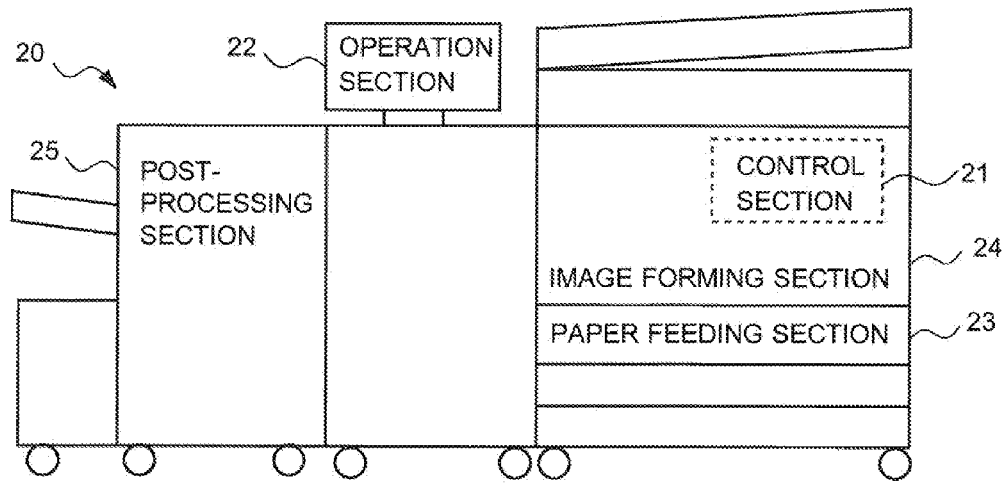
FIG. 3 is a diagram showing an outline structure of an image forming apparatus relating to an example of the present invention.
Figure 4:
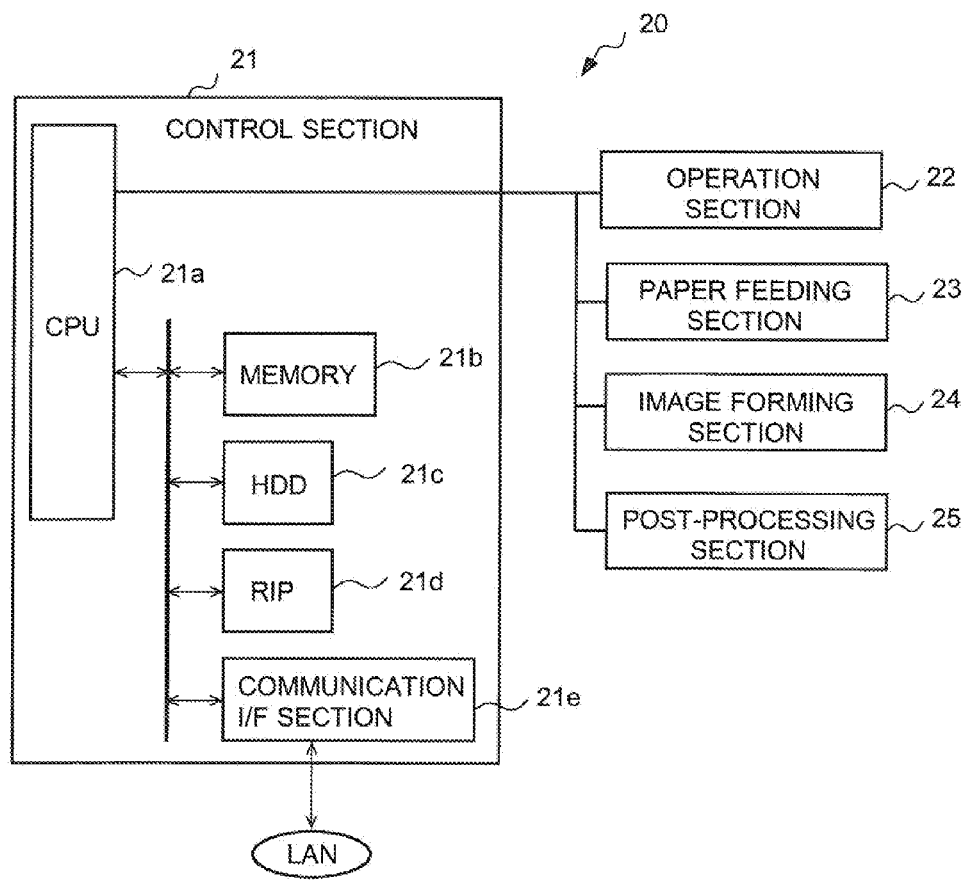
FIG. 4 is a block diagram illustrating a structure of an image forming apparatus relating to an example of the present invention.
Figure 5A:
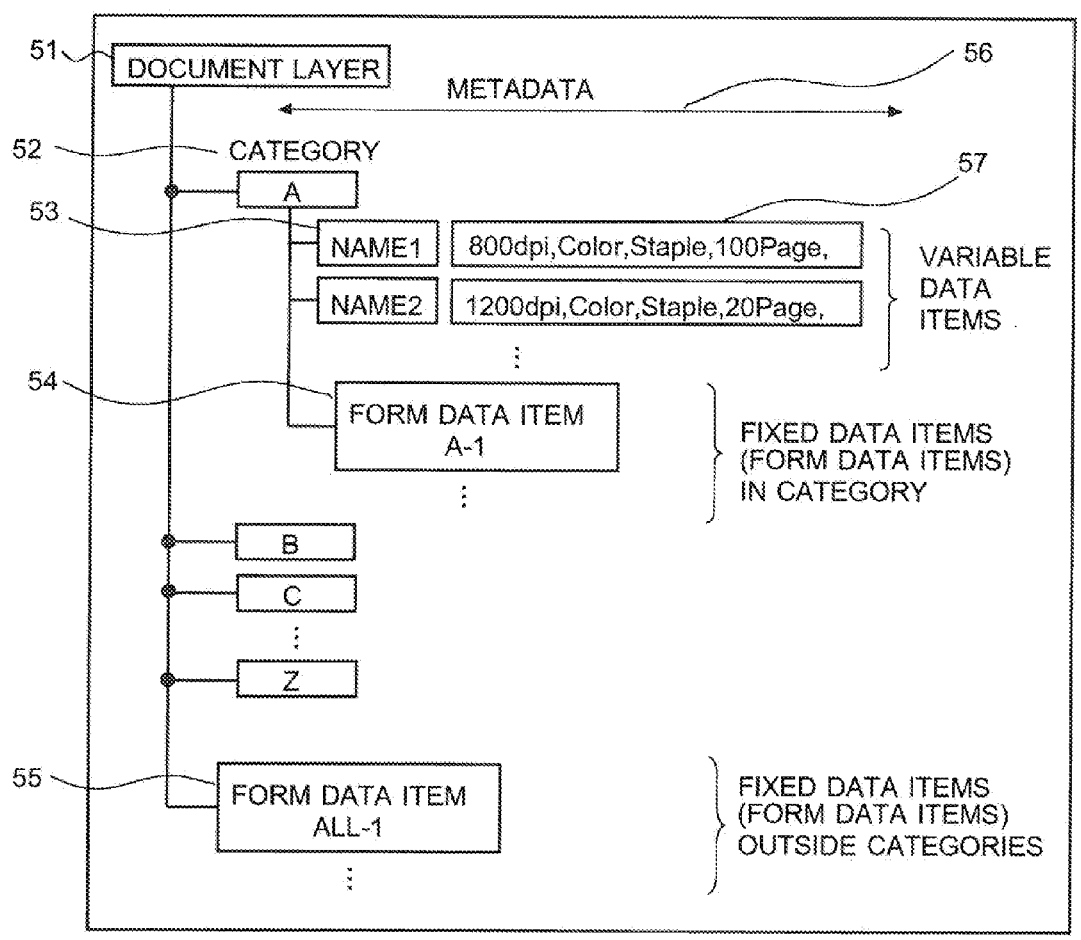
FIG. 5A shows an example of conventional variable data structure.
Figure 5B:
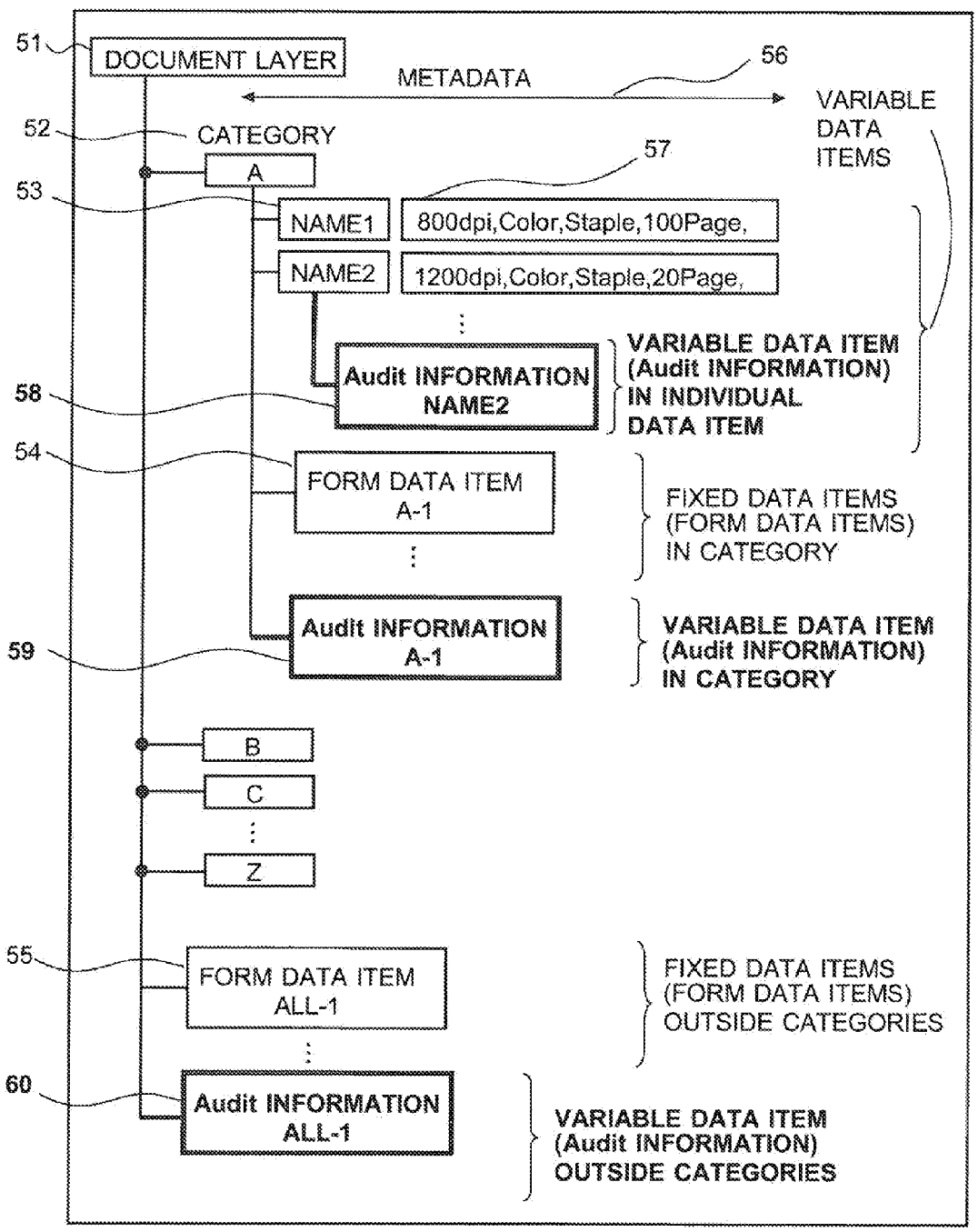
FIG. 5B shows an illustrative variable data structure of an example of the present invention.
Figure 7:
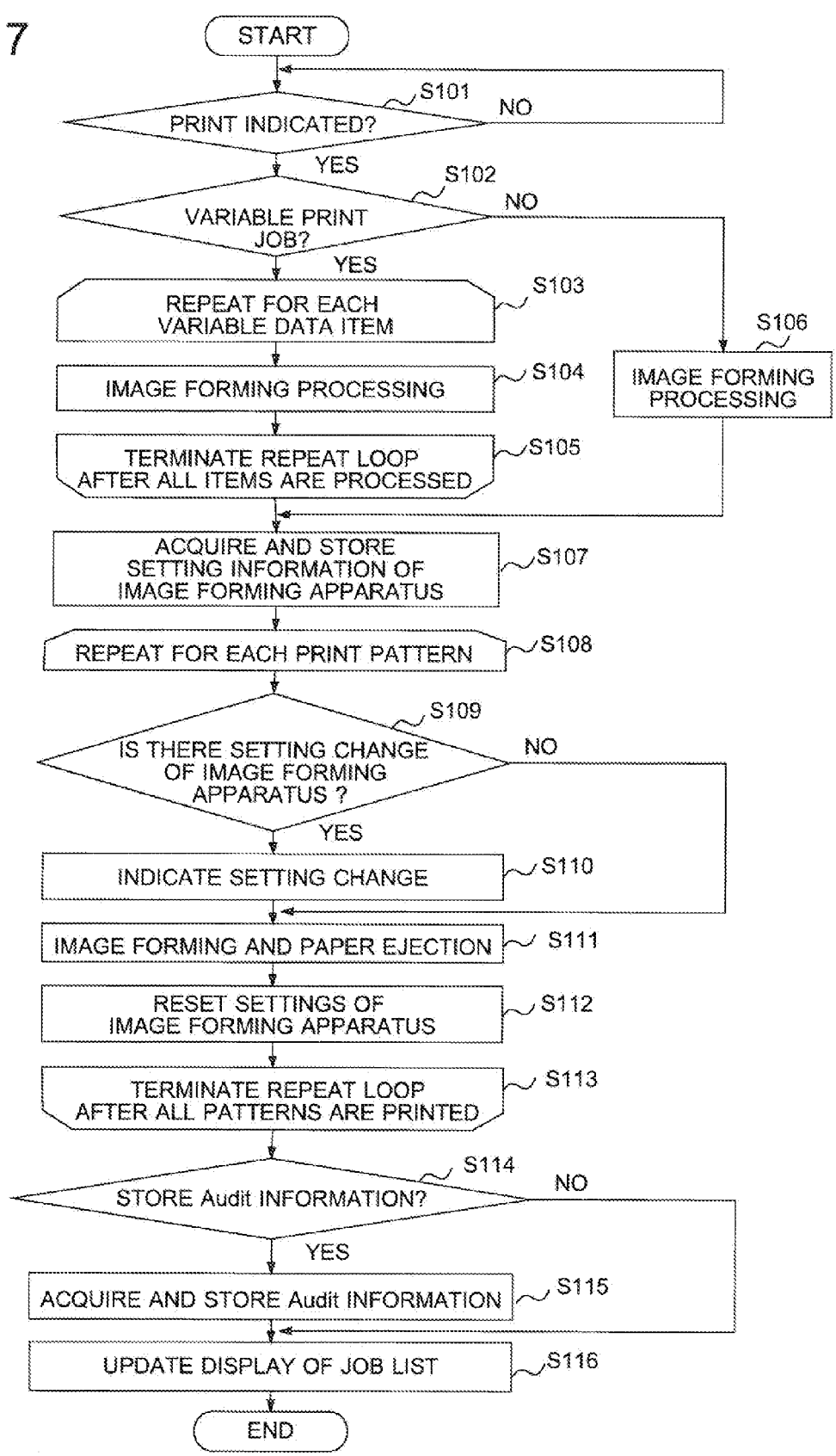
FIG. 7 is a flowchart illustrating a process of an image forming apparatus relating to an example of the present invention.
Figure 11:
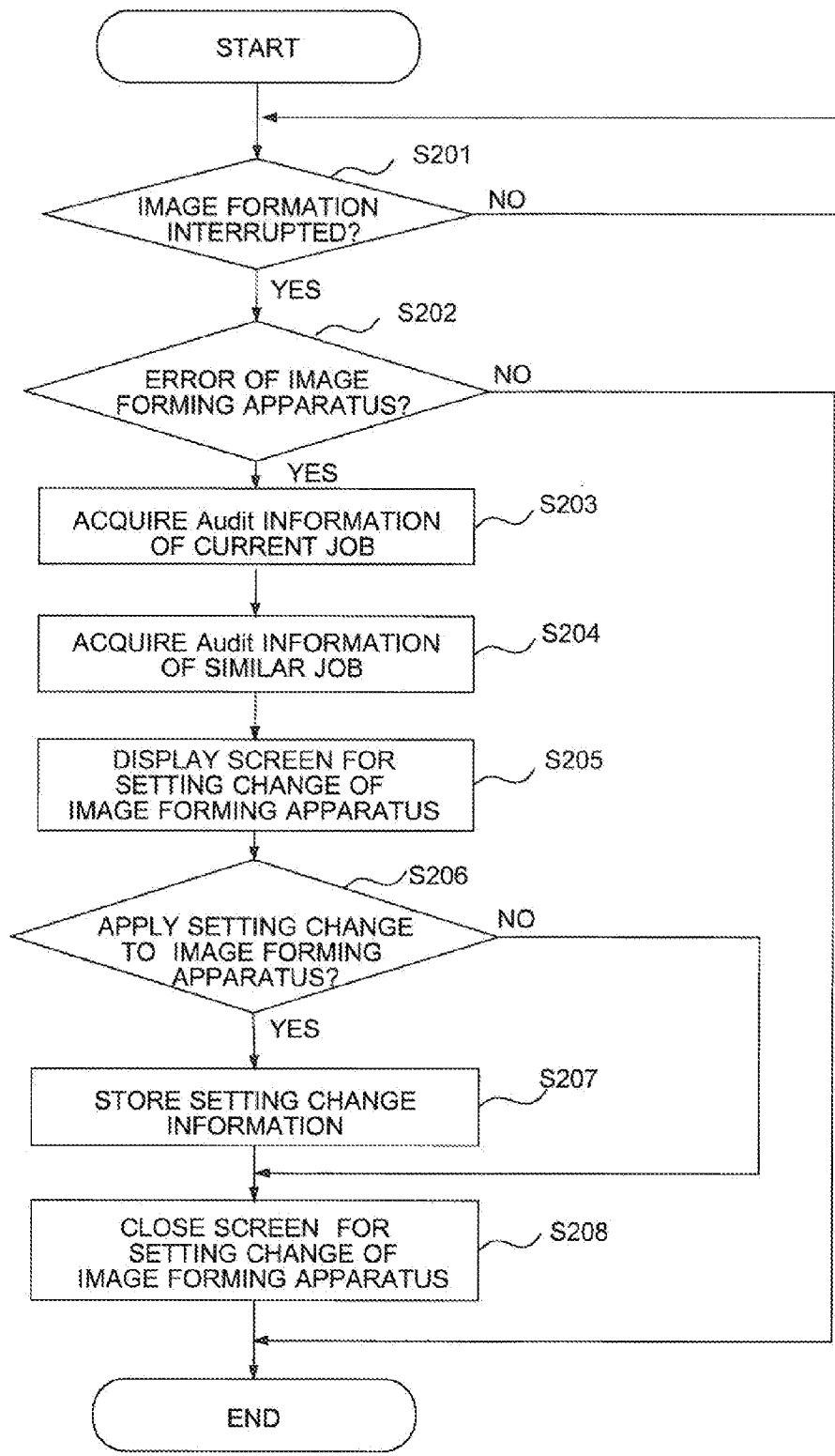
FIG. 11 is a flowchart illustrating a process of an image forming apparatus (a process under the condition that an image forming is interrupted) relating to an example of the present invention.

Examples of a variable printing system, image forming apparatus, and a non-transitory computer readable medium for controlling variable printing will be described with reference to FIGS. 1 to 11, for illustrating the above described embodiments in detail. FIG. 1 is a schematic view illustrating a structure of a variable printing system of the present example. FIG. 2 is a block diagram illustrating a structure of a computer terminal of the present example. FIG. 3 is a diagram showing an outline structure of an image forming apparatus of the present example. FIG. 4 is a block diagram illustrating a structure of an image forming apparatus of the present example. Each of FIGS. 5A and 5B shows an example of a variable data structure. FIG. 6 is a schematic view of an outline process of a variable printing system of the present example. Each of FIGS. 7 and 11 is a flowchart illustrating a process of an image forming apparatus of the present example. Each of FIGS. 8A and 8B shows an illustrative screen for displaying a job list. Each of FIGS. 9A to 9D and 10 shows an illustrative screen for displaying Audit information.

As shown in FIG. 1, variable printing system 10 of the present example includes computer terminal 10 as a client for sending a print job, image forming apparatus 20 for receiving a print job and executing variable printing, and server terminal 30 holding external reference data referred by image forming apparatus 20. Variable printing system 10, image forming apparatus 20 and server terminal 30 are communicatively connected with each other via network 40 such as LAN (Local Area Network) and WAN (Wide Area Network) which are defined by a standard such as ETHERNET (trademark), Token Ring, and FDDI (Fiber-Distributed Data interface). These devices will be concretely described below. The present example is described by using variable printing according to PDF/VT, but the present example may be applied to variable printing according to PPML similarly.

Computer Terminal:

As shown in FIG. 2, computer terminal 10 is composed of components including CPU (Central Processing Unit) 11, Memory 12, HDD (Hard Disk Drive) 13, communication interface section 14, display 15, and input device 16.

CPU 11 controls the other components. Memory 12 can be ROM (Read Only Memory) or RAM (Random Access Memory), and is a component to temporarily store various data read from a component such as HDD 13 and communication interface section 14. The stored data is processed by CPU 11, and is transferred to a component such as HDD 13 and communication interface section 14 as the need arises. HDD 13 stores programs which are used by CPU 11 to control the other components, information relating to processing functions of the device itself, and image data. CPU 11 reads out the stored programs as the need arises, and further processes and executes them on memory 12. Communication interface section 14 establishes a connection to server terminal 30, computer terminal 10, and other devices and performs transmission and reception of data. CPU 11, memory 12, HDD 13, and communication interface section 14 form a control section which creates print jobs of variable printing according to the PDF/VT standard and also works as a printer driver for transmitting the print jobs to image forming apparatus 20.

Display 15 is composed of a device such as a liquid crystal display (LCD) and an organic EL (Electro Luminescence) display, and displays various types of information. Display 15 further displays an operation screen for selecting a setting of a print job to be transmitted to image forming apparatus 20.

Input device 16 is a component for handling information displayed on display 15 and for inputting information, and is composed of a device such as a pointing device and a keyboard. Further, other devices such as a track ball, a track pad, a tablet and a stylus pen can be used for input device 16.

Image Forming Apparatus:

As shown in FIGS. 3 and 4, image forming apparatus 20 is composed of components including control section 21, operation section 22, paper feeding section 23, image forming section 24, and post processing section 25.

Control section 21 is a component to control the other components and is communicatively connected with CPU 21$a$, memory 21$b$, HDD 21$c$, RIP (Raster Image Processing) 21$d$, and communication interface section 21$e$ through a bus.

CPU 21$a$ controls the other components and performs image processing including a RIP process (as software). Memory 21$b$ is a component to temporarily store various data read from a component such as RIP 21$d$, communication interface section 21$e$, and HDD 21$c$. The stored image data is processed by CPU 21$a$, and is transferred to a component such as HDD 21$c$ and image forming section 24 as the need arises. HDD 21$c$ stores programs which are used by CPU 21$a$ to control the other components, and information relating to processing functions of the device itself. CPU 21$a$ reads the stored programs and further processes and executes the stored programs on memory 21$b$ as the need arises. RIP 21$d$ is composed of a software program processed by ASK (Application Specific Integrated Circuit) and CPU 21$a$, and forms bitmap images for use in variable printing. Communication interface section 21$e$ establishes a connection to server terminal 30, computer terminal 10, and other devices and performs transmission and reception of data.

Structural components for actually executing variable printing, such as image forming section 24 and paper feeding section 23, form an engine for variable printing. The engine is controlled by control section 21 and executes variable printing based on a print job received by communication interface section 21$e$. At that time, the engine uses setting information such as a setting of an adjustment of paper curl, a condition of air-blowing during a paper feed process, a paper feed speed, a fixing temperature, and printing positions on both sides of a sheet of paper.

Control section 21 further works as a variable-printing control section which carries out one of adding setting information of the engine as Audit information to a job instructing the engine to execute variable printing, and storing setting information of the engine as Audit information in a form of a database, and which instructs the engine to change a setting of the engine corresponding to a job to be executed or being executed based on a Audit information list prepared by gathering Audit information of jobs which were executed in past. The variable-printing control section may be provided as hardware or may be provided as a variable-printing control program including instructions causing control section 21 to work as a variable-printing control section.

Operation section 22 displays the order of submitting print jobs, where variable jobs are displayed according to their category. Operation section 22 further controls the order of submitting print jobs. Operation section 22 is composed of a touch panel, which allows various operations thereon. The operation function may be realized on an alternative such as the WEB and an application as far as it can provide an operation function, which is not limited to a touch panel.

Paper feeding section 23 is provided as a component to house printing paper therein, and also includes a part to feed printing paper to image forming section 24.

Image foaming section 24 is a general name of structural elements required for forming images in an image forming apparatus by utilizing image processing such as an electrophotographic recording and electrostatic recording. Image forming section 24 includes photoreceptors, a transfer belt, a fixing unit, and various types of conveyer belt. Image forming section 24 forms image data read from memory 21b into images on printing paper and transfers the printing paper to post-processing section 25. At that time, images are formed corresponding to setting information such as monochrome or color processing, resolution in 600/1200/2400 dpi, and paper size.

Post processing section 25 outputs printing paper transferred from image forming section 24 with performing a finishing process to the paper desired by a user, such as punching, stapling and binding, according to instructions from control section 21.

Next, a structure of variable data will be described referring to FIGS. 5A and 5B.

Variable data according to the conventional PDF/VT standard is composed of, as shown in FIG. 5A, document layer 51, category 52, variable data items 53, fixed data items 54, 55, metadata 56, and job ticket 57. Respective components will be described below.

Illustrative variable data of a job is provided as a file has a hierarchic structure wherein all items of page information and various kinds of metadata 56 are defined and categorized. Document layer 51 represents the root of the hierarchic structure.

Category 52 represents a condition to classify contents of variable data and is a part of the metadata. Category 52 can be flexibly defined, for example, for classification according to zip code, classification according to products, and classification according to customers' age. As a concrete scenario, the followings can be considered. For one month, the contents are classified into categories according to zip code, in order to send direct mails, centering on a specific area. For another month, the contents are classified into categories according to products, in order to concentrate on sales promotion of a specific kind of product. When a printing process is actually performed, a scenario that jobs are submitted with being separated according to category can be considered.

Variable data item 53 is a kind of metadata. Variable data item 53 defines personal information therein such as a customer name, address, zip code, age, and annual earnings in a general manner, and is associated with other items such that which fixed data item is used by the variable data item. Variable data item 53 further includes information about a structure such that which variable data item is arranged at which place in each page.

Fixed data item (in other words form data item) 54, 55 is a kind of metadata, which may be reused by plural jobs including variable data items. As examples of the fixed data items, there are cited logo data, product picture and barcode data, and external reference data. A fixed data item includes various types of hint information such as information whether the data is reused or not information whether the data is reused across plural pages or not, and information whether the data is used by plural jobs. A fixed data item may be defined inside a category. Alternatively, a fixed data item may be defined outside categories, where the fixed data item is referred by all the categories.

Job ticket 57 is a kind of metadata, by which output settings for each job (for example, stapling and 600 dpi) can be defined.

Metadata 56 includes category 52, variable data item 53, fixed data item 54, 55, and job ticket 57, and is defined by using a rule such as XML (Extensible Markup Language) and JDF (Job Definition Format) to form a hierarchical structure.

Variable data of the present example includes variable data items (as Audit information) 58, 59, 60, as shown by bolded characters in FIG. 5B.

Each of variable data items (as Audit information) 58, 59, 60 is a kind of metadata, wherein Audit information such as an output result of a job, adjustment information of paper curl, an air-blowing condition under paper feeding, paper feed speed, printing positions of both sides of a sheet of paper, and a fixing temperature is defined in a general manner. The Audit information may be defined in an individual variable data item (see variable data item 58), or may be defined inside a category (see variable data item 59). Further, Audit information may be defined outside the categories, where the Audit information is referred by all the categories (see variable data item 60).

FIG. 6 is a diagram illustrating addition of Audit information to a job and job-output instructions decided with taking account of Audit information. The present example is described by using a situation that the addition of Audit information to a job and job-output instructions decided with taking account of Audit information are performed mainly in image forming apparatus 20. However, as shown in FIG. 6, the addition of Audit information to a job and job-output instructions decided with taking account of Audit information may be performed in computer terminal 10 or server terminal 30 other than image forming apparatus 20. Further, one of the addition of Audit information to a job and job-output instructions decided with taking account of Audit information may be performed in computer terminal 10 or serer terminal 30, and the other may be performed on image forming apparatus 20.

Next, a print process of control section 21 of image forming apparatus 20 of the present example will be described with reference to the flowchart of FIG. 7.

When image forming apparatus 20 receives a print job from a network through communication interface section 21e of image forming apparatus 20 in a network printing process, image forming apparatus 20 makes specified paper feeding section 23 feed paper, in order to print out images which have been formed. Herein, a general name of print jobs received from communication interface section 21e is assumed to be a "print job". The print job is composed of print job information (also called as a job ticket setting) and image data of, for example, four colors of CYMK. The print job is temporarily stored in memory 21b and is converted into print image data by which image forming section 24 can form images on paper. HDD 21c stores various programs for converting a print job into print image data capable to be formed into images, and CPU 21a reads a desired program.

Control section 21 remains in a standby condition until the control section 21 receives a print job (S101). When control section 21 receives a print job (S101; YES), control section 21 judges whether the print job is a variable print job or not (S102). When it is not a variable print job (S102; NO), control section 21 analyzes on memory 21b print job information and information of pages to be printed, both of which are included in the print job, and carries out image forming processing for each page data (S106).

On the other hand, when the print job is a variable print job (S102: YES), control section 21 analyzes on memory 21b print job information and information of pages to be printed both of which are included in the print job, and stores the analyzed result into HDD 21c. A variable print job can contain plural pieces of data and job tickets which are mixed. Control section 21 analyzes information for each variable data item. Control section 21 repeats image forming processing as much as the number of variable data items by using print job information and information of pages to be printed both included in the print job (S103-S105).

Next, control section 21 acquires setting information of image forming apparatus 20 and stores the setting information to memory 21b (S107). After that, control section 21 repeats the following steps for each of print patterns represented by plural pieces of data and job tickets (S108). First, control section 21 checks whether there is a setting of image forming apparatus 20 to be changed (S109). The existence of the setting change may be managed by using an actual file containing the database or may be managed by using a job list. In the case that the existence of the setting change is managed by using the job list shown in FIGS. 8A and 8B, "Device Settings" has been set to "No settings" in jobs in FIG. 8A and control section 21 does not change the settings of image forming apparatus 20 for such the jobs (S109: NO), On the other hand, for jobs to change the apparatus setting, such as JobID: 101001-002 and JobID: 101001-004 shown in FIG. 8B (S109: YES). control section 21 changes the settings of image forming apparatus 20 (S110). In the case that another terminal such as computer terminal 10 and server terminal 30 is used to change the settings, information of the setting change is transmitted to image forming apparatus 20 with an interface of serial transmission, which allows the setting change by using another terminal. The setting change of image forming apparatus 20 will be described in detail later.

Next, image forming apparatus 20 prints images formed in the image forming process, and ejects the material on which the images are formed into an output tray (S111) after carrying out post-processing in post-processing section 25 if it is required. After that, control section 21 resets the settings of image forming apparatus 20 to be the settings which have been stored in S107 if it is required (S112). For example, in the case of JobID:101001-002 in FIG. 8A, only Audit information of a similar job is changed in FIG. 11, which will be described later, and the reset processing is required. On the other hand, in the case such that settings are changed by specifying an input tray in FIG. 11, the reset process is not required.

After the image formation, control section 21 judges whether there is a need to store the Audit information or not (S114). If there is a need to store the Audit information (S 114: YES), control section 21 acquires the Audit information and stores it into HDD21c (S115). For example, control section 21 acquires setting information of the engine, such as a setting of an adjustment of paper curl, a condition of air-blowing during a paper feed process, a paper feed speed, a fixing temperature and printing positions on both sides of a sheet of paper, as Audit information, and stores it in HDD 21c. After that, control section 21 updates information of the job list stored in HDD21c and updates a screen displayed in display 15 of image forming apparatus 20 (S116), and then completes the processing.

Figure 9C:
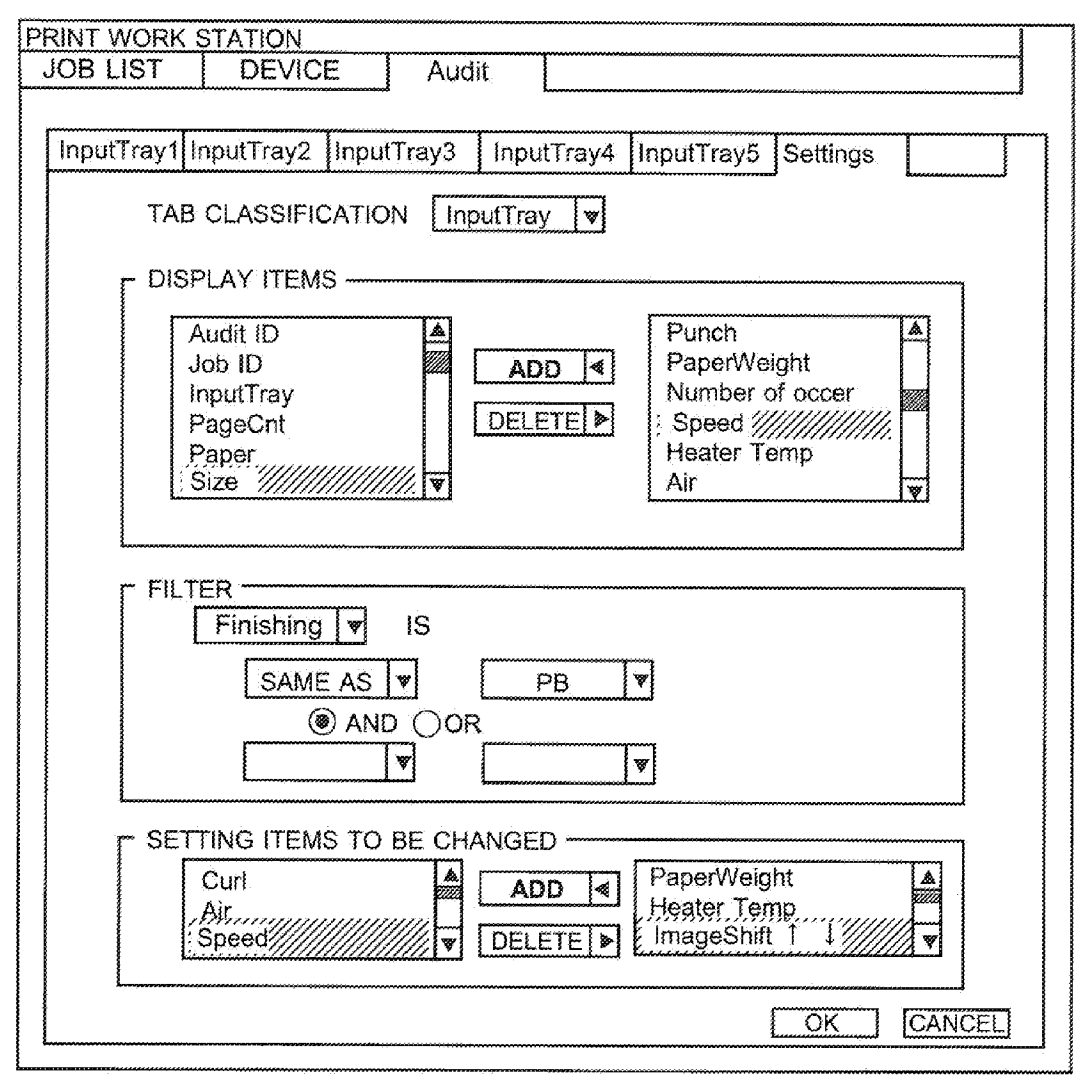
Figure 9D:
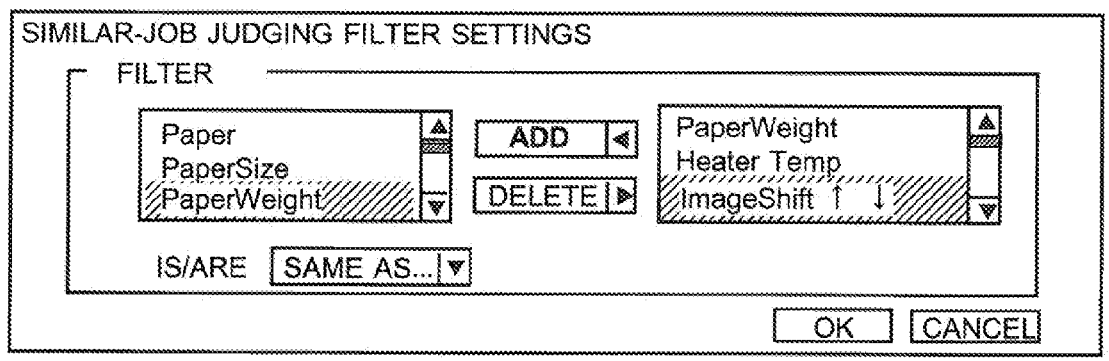
FIG. 9D shows an illustrative screen for setting a similar-job judging filter relating to an example of the present invention.

Hereinafter, a setting change of image forming apparatus 20 will be described. Control section 21 stores an output result of image forming apparatus 20 into an Audit information list in the step of acquiring and storing Audit information (S115). Control section 21 then judges whether there is a setting change of image forming section 20 or not, based on the Audit information list prepared by gathering output results obtained in the past each of FIGS. 9A and 9B shows an illustrative screen for displaying the Audit information list. FIG. 9C shows an illustrative screen for setting the Audit information screen, and FIG. 9D shows an illustrative screen for setting a similar-job judging filter.

FIG. 9A shows an Audit information list wherein items are classified according to InputTray (input trays). In the list, items of Audit information appear in order defined by the screen for setting the Audit information screen shown in FIG. 9C. Herein, it is assumed a the filter for setting the Audit information screen is set to "Result (output result) is the same as Complete". The listed items are sorted in order of PageCnt (the number of outputted pages) so that listed items with good results may appear at upper positions. In this example, setting items of Curl, Air, and Speed (in shaded areas in FIG. 9A) are set as setting items to be changed, and a listed item of Audit information in bold letters is selected as a candidate item for the setting change. An object to which the settings are applied is set to a similar job. In this case, selecting Apply button replaces the settings of Curl, Air, and Speed of a similar job which has been searched according to the settings of the similar-job judging filter in FIG. 9D (the condition that settings of Paper, PaperSize, and PaperWeight are the same as those of the selected candidate item for the setting change), with settings of Audit information of the selected (bold) item.

FIG. 9B shows an Audit information list where in items are classified according to Result (output results), wherein items which have caused a jam or jams are listed in order of frequency of occurrence of jams. Items with no-good output results appear at upper positions of the list, which is different from the case of FIG. 9A. In this case, selecting Apply button replaces the settings of Paper, Size, Curl, Air and Speed of InputTray 5 which has been selected as an object to which the settings are applied, with corresponding settings of Audit information of the selected (bold) item, which is useful in confirming reproducibility of a trouble in the case that errors frequently occurred in a specific input tray and in confirming whether the trouble would not occur in another input tray.

In FIGS. 9A and 9B, data structures of respective jobs are not illustrated. However, it is considered that a similar job which has been searched as an item whose settings of Paper, PaperSize, and PaperWeight are the same as the candidate item has similar fixed data items as the candidate item. Therefore, the settings of the engine corresponding to a job wherein a some kind of fixed data item has been formed into an image with a good result, is reflected to the settings of the engine corresponding to a job for forming a similar kind of fixed data item into an image.

Each of FIGS. 9A and 9B shows an example of the case when the settings of image forming apparatus 20 are changed before images are formed. Alternatively, the settings of image forming apparatus 20 may be changed during an image formation process. FIG. 10 shows an illustrative screen for setting in such the case, and FIG. 11 shows flow of the processing.

Control section 21 judges whether image formation is interrupted or not (S201). When the image formation is interrupted (S201: YES), control section 21 confirms a reason of the interruption by using error information informed from other sections. If the reason of the interruption does not come from errors in the image forming apparatus itself, such as out of tonner and out of paper (S202: NO), control section 21 terminates the processing. On the other hand, if the reason of the interruption comes from errors in the image forming apparatus itself, such as a jam and extraordinary temperature (S202: YES), control section 21 acquires Audit information of the current job (S203), and acquires Audit information of a job which is similar as the current job out of items of the Audit information list (S204).

Next, control section 21 displays a screen for a setting change of image forming apparatus 20, by using Audit information both of the current job and the similar job which have been acquired (S205). When a user operates operation section 22 to instruct to apply the setting change (S206: YES), control section 21 changes the settings of the specified job and stores information of the setting change (S207), and terminates displaying the screen for the setting change (S208).

FIG. 10 shows an illustrative screen for a setting change relating to JobID: 101001-002 shown in FIG. 8A, wherein PB jobs which have been terminated in normal are listed according to the decreasing number of successful results. Similarly to FIG. 9A, the items of Curl, Air and Speed which appear in shaded areas, are set as setting items to be changed. Selection of Apply button replaces the setting items of Curl, Air, and Speed of a similar job which has been searched according to the filter settings for judging a similar job in FIG. 9D (the condition that settings of Paper, PaperSize, and PaperWeight are the same as those of the selected candidate item for the setting change), with corresponding settings of Audit information of the selected (bold) item. FIG. 8B shows an illustrative screen of the job list after the settings are changed, in which items of JobID:101001-002, JobID:101001-004 and JobID:101005 are partially changed.

As described above, in the present example, control section 21 of image forming section 20 (a variable-printing control program stored in a non-transitory computer readable medium, or a variable-printing control method) adds setting information of the engine to a job as Audit information, or stores the information in a form of a database as Audit information. Control section 21 further instructs the engine to change a setting of the engine corresponding to a job to be executed later or a job being executed to be same as the setting of the engine corresponding to a job wherein a prescribed output result has been obtained, based on the Audit information list prepared by gathering items of Audit information of jobs which were executed in past. It allows efficient variable printing.

While the present example of the present invention have been described using specific terms, such description is for illustrative purpose only, and it is to be understood that changes and variations may be made without depending from the spirit or scope of the appended claims.

For example, in the present example, the processing mainly carried out on image forming apparatus 20. However, as shown in FIG. 6, at least one of addition of Audit information and instructions of a job output in accordance with Audit information may be carried out on another device such as computer terminal 10 or server terminal 30.

For example, when the said processing is carried out on computer terminal 10, the control section of computer terminal 10 can work as a first control section which acquires Audit information from image forming apparatus 20, adds the Audit information to a job and transmits the job to image forming apparatus 20. Further, before the transmission of the job, the control section of computer terminal 10 can instruct a change of the setting of the engine to image forming apparatus 20 or can transmit a job including instructions of the change of the setting of the engine to image forming apparatus 20, based on a result obtained by analyzing the Audit information list. In other words, the control section of computer terminal 10 can work as a second control section which makes an analysis of an output result of a job which has been executed and of setting information of the engine corresponding to the job which has been executed, and instructs the engine to change a setting of the engine corresponding to a job to be executed or being executed based on the result of the analysis.

When the said processing is carried out on server 30, the control section of the server terminal 30 can works as a first control section which acquires a job from computer terminal 10 or image forming apparatus 20, acquires Audit information from image forming apparatus 20, and carries out one of adding the Audit information to the job and storing the Audit information in a form of a database to manage the Audit information. Further, the control section of server terminal 30 can analyze an Audit information list and instruct a change of the setting of the engine to image forming apparatus 20 based on the result of the analysis. In other words, the control section of server terminal 30 can work as a second control section which makes an analysis of an output result of a job which has been executed and of setting information of the engine corresponding to the job which has been executed, and instructs the engine to change a setting of the engine corresponding to a job to be executed or being executed based on a result of the analysis.

As another example, variable printing may be carried out by a structure that a control section of any one of computer terminal 10 and server terminal 30 works as the first control section and control section 21 of image forming apparatus 20 works as the second control section, or a structure that control section 21 of image forming apparatus 20 works as the first control section and a control section of any one of computer terminal 10 and server terminal 30 works as the second control section.

The present example has been described by using a condition that variable data according to the PDF/VT standard is used. However, it can be applied also to the condition that various types of variable data according to other standards such as PPML, wherein items of Audit information can be stored in a form of a database to be managed and can be used for instructions of output of a job.

The invention claimed is:
1. A variable printing system comprising:
   an image forming apparatus including an engine configured to execute variable printing based on a job including a variable data item and a fixed data item;
   a device communicatively connected to the image forming apparatus via a communication network;
   a first control section included in one of the image forming apparatus and the device communicatively connected to the image forming apparatus, wherein the first control section acquires setting information of the engine corresponding to a job instructing the engine to execute variable printing, and carries out one of adding the setting information into the job instructing the engine to execute variable printing, and storing the setting information in a form of a database with associating the setting information with the job instructing the engine to execute variable printing; and a second control section included in one of the image forming apparatus and the device communicatively connected to the image forming apparatus, wherein the second control section makes an analysis of an output result of a job which has been executed and of setting information of the engine corresponding to the job which has been executed, and instructs the engine, based on a result of the analysis, to change a setting of the engine corresponding to a job to be executed or being executed.

2. The variable printing system of claim 1, wherein the device includes the first control section, and the image forming apparatus includes the second control section.

3. The variable printing system of claim 1, wherein the second control section selects a similar job being similar to a job which has been executed with a normal result, from among jobs to be executed or being executed, and instructs the engine to change a setting of the engine corresponding to the similar job to be same as a setting of the engine corresponding to the job which has been executed.

4. The variable printing system of claim 3, wherein the similar job is a job to form a fixed data item included in the job which has been executed into an image.

5. The variable printing system of claim 1, wherein the setting information of the engine is information relating to at least one of a setting of an adjustment of paper curl, a condition of air-blowing during a paper feed process, a paper feed speed, a fixing temperature, and printing positions on both sides of a sheet of paper.

6. The variable printing system of claim 1, wherein the job is a file having a hierarchical structure which includes one or more categories each including at least one of a variable data item and a fixed data item, and the first control section adds the setting information of the engine as a variable data item to at least one place in the variable data item, the one or more categories and an outside of the one or more categories.

7. An image forming apparatus comprising:

an engine configured to execute variable printing based on a job including a variable data item and a fixed data item; and a control section which acquires setting information of the engine corresponding to a job instructing the engine to execute variable printing, carries out one of adding the setting information into the job instructing the engine to execute variable printing, and storing the setting information in a form of a database with associating the setting information with the job instructing the engine to execute variable printing, makes an analysis of an output result of a job which has been executed and of setting information of the engine corresponding to the job which has been executed, and instructs the engine, based on a result of the analysis, to change a setting of the engine corresponding to a job to be executed or being executed.

8. The image forming apparatus of claim 7, wherein the control section selects a similar job being similar to a job which has been executed with a normal result, from among jobs to be executed or being executed, and instructs the engine to change a setting of the engine corresponding to the similar job to be same as a setting of the engine corresponding to the job which has been executed.

9. The image forming apparatus of claim 8, wherein the similar job is a job to form a fixed data item included in the job which has been executed into an image.

10. The image forming apparatus of claim 7, wherein the setting information of the engine is information relating to at least one of a setting of an adjustment of paper curl, a condition of air-blowing during a paper feed process, a paper feed speed, a fixing temperature, and printing positions on both sides of a sheet of paper.

11. The image forming apparatus of claim 7, wherein the job is a file having a hierarchical structure which includes one or more categories each including at least one of a variable data item and a fixed data item, and the first control section adds the setting information of the engine as a variable data item to at least one place in the variable data item, the one or more categories and an outside of the one or more categories.

12. A non-transitory computer readable storage medium storing a program to control variable printing in a system, the system including an image forming apparatus including an engine configured to execute variable printing based on a job including a variable data item and a fixed data item, the program comprising:

first instructions, when executed, causing one of the image forming apparatus and a device communicatively connected to the image forming apparatus to:

acquire setting information of the engine corresponding to a job instructing the engine to execute variable printing, and carry out one of adding the setting information into the job instructing the engine to execute variable printing, and storing the setting information in a form of a database with associating the setting information with the job instructing the engine to execute variable printing; and second instructions, when executed, causing one of the image forming apparatus and a device communicatively connected to the image forming apparatus to:

make an analysis of an output result of a job which has been executed and of setting information of the engine corresponding to the job which has been executed, and instruct the engine, based on a result of the analysis, to change a setting of the engine corresponding to a job to be executed or being executed.

13. The non-transitory computer readable storage medium of claim 12, wherein the second instructions causes the one of the image forming apparatus and the device communicatively connected to the image forming apparatus to:

select a similar job being similar to a job which has been executed with a normal result, from among jobs to be executed or being executed, and instruct the engine to change a setting of the engine corresponding to the similar job to be same as a setting of the engine corresponding to the job which has been executed.

14. The non-transitory computer readable storage medium of claim 13, wherein the similar job is a job to form a fixed data item included in the job which has been executed into an image.

15. The non-transitory computer readable storage medium of claim 12, wherein the setting information of the engine is information relating to at least one of a setting of an adjustment of paper curl, a condition of air-blowing during a paper feed process, a paper feed speed, a fixing temperature, and printing positions on both sides of a sheet of paper.

* * * * *